(12) United States Patent
Greenberg et al.

(10) Patent No.: US 10,021,837 B2
(45) Date of Patent: Jul. 17, 2018

(54) RADIO-CONTROLLED LUMINAIRE WITH INTEGRATED SENSORS

(71) Applicant: iUNU, LLC, Seattle, WA (US)

(72) Inventors: Adam Phillip Takla Greenberg, San Francisco, CA (US); Kyle Terrence James Rooney, Seattle, WA (US); Travis Anthony Conrad, Bellevue, WA (US)

(73) Assignee: iUNU, LLC, Seattle, WA (US)

( * ) Notice: Subject to any disclaimer, the term of this patent is extended or adjusted under 35 U.S.C. 154(b) by 239 days.

(21) Appl. No.: 15/011,436

(22) Filed: Jan. 29, 2016

(65) Prior Publication Data

US 2016/0219794 A1 Aug. 4, 2016

Related U.S. Application Data

(60) Provisional application No. 62/110,373, filed on Jan. 30, 2015.

(51) Int. Cl.
| | |
|---|---|
| *G05B 15/02* | (2006.01) |
| *A01G 7/04* | (2006.01) |
| *H05B 37/02* | (2006.01) |
| *A01G 27/00* | (2006.01) |
| *F21V 21/36* | (2006.01) |
| *F21V 23/04* | (2006.01) |

(52) U.S. Cl.
CPC ........... *A01G 7/045* (2013.01); *A01G 27/003* (2013.01); *H05B 37/0227* (2013.01); *H05B 37/0272* (2013.01); *F21V 21/36* (2013.01); *F21V 23/0442* (2013.01); *Y02P 60/146* (2015.11)

(58) Field of Classification Search
CPC .............................. A01G 7/045; A01G 27/003
USPC ............................................................ 700/9
See application file for complete search history.

(56) References Cited

U.S. PATENT DOCUMENTS

| | | | |
|---|---|---|---|
| 2012/0229048 A1* | 9/2012 | Archer ............... | H05B 37/0245 315/297 |
| 2014/0117852 A1* | 5/2014 | Zhai ................... | H05B 37/0245 315/86 |
| 2014/0352211 A1* | 12/2014 | Liotta .................... | A01G 7/045 47/58.1 LS |
| 2015/0145419 A1* | 5/2015 | Lashina ............. | H05B 33/0872 315/153 |
| 2015/0342125 A1* | 12/2015 | Krijn ...................... | A01G 7/045 315/152 |
| 2016/0242264 A1* | 8/2016 | Pakkala ............. | H05B 37/0272 |

* cited by examiner

*Primary Examiner* — Anthony Ho
(74) *Attorney, Agent, or Firm* — Han Santos, PLLC

(57) ABSTRACT

Horticultural lighting may be provided by radio-controlled luminaires with integrated sensors. A distance from a bottom of the luminaire to a plant canopy is determined via the ultrasonic sensor at a predetermined interval. Upon determining that the distance from the bottom of the luminaire to the plant canopy is not at a predetermined distance, the distance is adjusted to the predetermined distance. The light spectrum over time on the plant is adjusted by varying a wavelength of the luminaire over a predetermined time period based on wireless instructions received from a master controller.

20 Claims, 6 Drawing Sheets

RADIO-CONTROLLED LUMINAIRE WITH INTEGRATED SENSORS

CROSS REFERENCE TO RELATED PATENT APPLICATION

This application claims priority to U.S. Provisional Patent Application No. 62/110,373, filed on Jan. 30, 2015, entitled "Radio-Controlled Lighting Fixture with Integrated Sensors," which is hereby incorporated by reference in its entirety.

BACKGROUND

Lighting has many applications across a number of industries. Different spectrums of light serve different purposes that range from illuminating a work environment for optimizing safety to being used in the manufacturing of printing circuit boards. One application in particular that is experiencing a rise in attention is horticulture. Artificial lighting has been used to grow plants for decades, but the technology to do so has experienced only minor improvements compared to innovations in all other aspects of growing plants, such as grow mediums, nutrients, and irrigation systems. The use of lighting for horticulture is expected to increase dramatically over the coming decades, which will give rise to more advanced technologies and control methods that eliminate the deficiencies of the known lighting systems.

Conventional lighting control systems are limited by the lighting technology used within the system. Typical lighting used in horticultural applications, such as high intensity discharge (HID), produce a fixed spectrum inherent to the bulb being used. Two different bulbs are commonly used; Metal halide (MH) bulbs produce blue-focused light (400-500 nm), which is most useful during vegetative growth stages, whereas high pressure sodium (HPS) bulbs produce red-focused light (600-700 nm), which is better suited for flowering growth stages. Light emitting diode (LED) technology is limited in terms of the diodes used to create the lighting array within a fixture. The spectrum produced is a conglomerate of the diodes used in the array; however, the result is an incomplete spectrum due to wavelengths being omitted, since such a conglomerate may not have a diode for every wavelength.

Modification of the spectrum produced is based on the active diodes. For example, if a user desires a red-focused spectrum, the 400 nm to 500 nm diodes would be deactivated, resulting in loss of a full spectrum and light intensity. Light intensity is described herein in terms of photosynthetic photon flux density (PPFD) measured in micromoles of photons per meter squared per second, ($\mu mol/m^2/s$). This sacrifice is not desirable as all plants have evolved under a full spectrum of considerable intensity, so there is a need to be able to control spectrum without omitting parts of it entirely. While an LED can be dimmed, such dimming only decreases intensity and does not affect the spectrum produced.

As a result of these limitations of the present technology, a user's ability to more effectively achieve the ultimate goal of an artificial light source, namely the replication of natural sunlight, is reduced. These limitations include spectral shifts over the course of a day based on the sun position, angle of incidence, and other attributes. Specifically, the spectrum of natural sunlight tends toward a more red focus during sunrise and sunset and a more blue focus in the afternoons. Further, there is a progression of the spectrum of the sunlight between sunrise and sunset that is not easily replicated.

Beyond spectral control, conventional technologies lack the ability to integrate well with auxiliary components that are used for monitoring and control of an indoor horticulture environment. Currently, expensive add-on control systems are used to manage these lighting technologies, yet still fall short in capabilities and overall integration of all parts of the system. Integrating other functions into this basic configuration is not only expensive, but typically requires professional installation and configuration.

Even with the use of available add-ons, some functions are not available, such as automatic height adjustment of a luminaire or using a luminaire to visually monitor the crop area that a light is covering. Optimum distance from canopy is approximately twelve to eighteen inches, and as of now no lighting fixture can be automatically adjusted to maintain this optimum height throughout the growth cycle.

Other features not available using conventional lighting technologies include the ability to determine root mass using non-invasive sensors as well as to track height adjustment data to analyze plant growth rates. For example, current control systems could not detect the size or track the growth rate of the root mass and adjust the feeding schedule automatically based on the data.

Accordingly, there is an unmet need for a horticultural lighting system where there is control over power (e.g., intensity), spectrum (e.g., wavelength), coverage (e.g., area), and other factors, as a function of time. Because plants go through different growth stages, where each stage benefits from a different light configuration, tailoring a horticultural lighting system to these different stages would result in a highly efficient and optimized system. However, present technology does not perform this dynamic configuration to optimize for different growth stages because present technology does not have the ability to monitor and adjust spectrum, power, heat dispersion, moisture, and other variables conducive to growing. Accordingly, there is a need to have horticultural lighting that can respond dynamically to environment conditions using various sensors and other horticultural components.

Accordingly, there is a need for a lighting technology that allows the successful integration of auxiliary functions as well as an increased ability to replicate natural sunlight more accurately based on the spectral changes over the course of a day. There is also a need to monitor crops based on the luminaire covering the specific site to increase user control and gain real time plant development data.

BRIEF DESCRIPTION OF THE DRAWINGS

The Detailed Description is set forth with reference to the accompanying figures.

DETAILED DESCRIPTION

Overview

This disclosure is directed to horticultural lighting, and more particularly, to a sensor-based horticultural lighting system. In various embodiments the system is configured to provide an automated environment for plant growth, to monitor and track plant development data, and to initiate events in response to preconfigured criteria being satisfied by transmitted sensor data. Various embodiments of a sensor-based horticultural lighting system may include a master controller, a database, a luminaire, an auxiliary sensor, and/or other remote-controlled elements.

This disclosure describes in part, a luminaire comprising integrated sensors. In one aspect, there is intelligent wireless control operative to replicate natural sunlight cycles, optimize plant growth, and automate tracking of growth data.

The radio-controlled horticultural lighting system may include a luminaire lighting fixture integrated with ultrasonic and light sensors. The luminaire is configured to transmit sensor data to a master controller having control software. The control software may be communicative with a microcontroller. The master controller acts as a coordinator for a mesh network of integrated and auxiliary sensors and components that may be monitored and controlled in real time.

Auxiliary sensors may include sensors for pH, electro-conductivity, volumetric water content, and total dissolved solids. A database may be continually updated at a predetermined period, with sensor data to monitor plant provenance (e.g., development) over time. Automated responses to substantially satisfied sensor criteria may include sending user notifications, adjusting luminaire height with respect to canopy height, adjusting irrigation schedule and/or nutrient feeding composition, and altering the desired spectrum output setting of luminaire plasma lighting.

Example Luminaire Components

Figure 1:
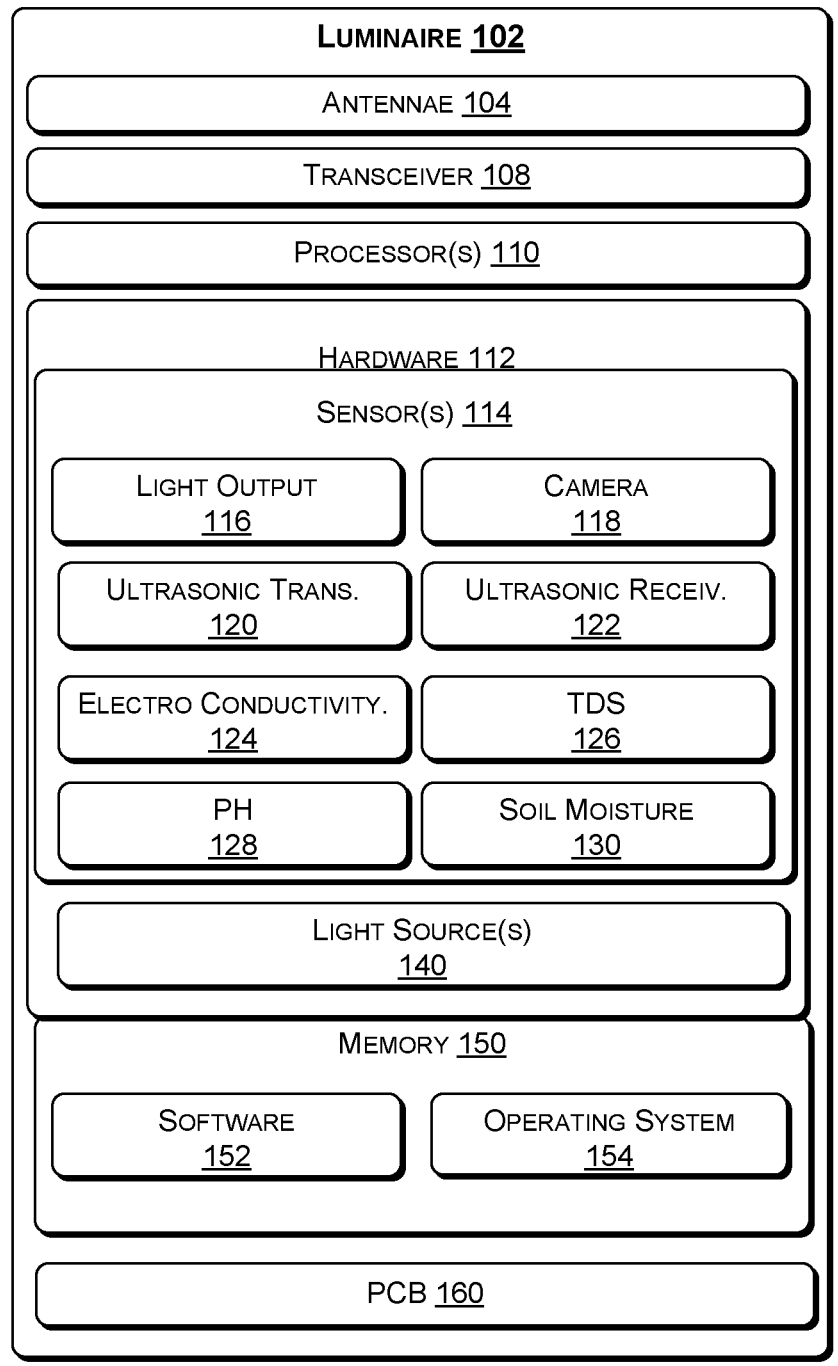
FIG. 1 is a block diagram showing various hardware, software, and communication components of an illustrative luminaire.

FIG. 1 is a block diagram showing various hardware, software, and communication components of an illustrative luminaire 102. In various embodiments, the luminaire 102 may be a lighting fixture configured to create light within the non-visible and visible spectrums (e.g., UV, visible light, and infrared) using solid state lighting technology, such as light emitting plasma (LEP) or advanced plasma lighting (APL).

The luminaire 102 may include, among other components, one or more antennae 104, transceiver 104, one or more processors 110, hardware 112, and memory 130. In some embodiments, the antennae 104 include an uplink antenna that sends radio signals to a master controller (discussed later) and/or a radio controlled hoist (discussed later). In addition there may be a downlink antenna that receives radio signals from the same master controller and/or radio controlled hoist. In other embodiments, a single antenna may both send and receive radio signals. These signals may be processed by a transceiver 108 that is configured to receive and transmit data.

The luminaire 102 may include one or more processors 110, which may be a single-core processor, a multi-core processor, a complex instruction set computing (CISC) processor, or another type of processor. The hardware 112 may include a power source and digital signal processors (DSPs), which may include single-core or multiple-core processors. The processors may perform operation in parallel to process a stream of data that may be provided by various sensors 114.

The hardware 112 may also include network processors that manage high speed communication interfaces, including communication interfaces that interact with peripheral components. The network processors and the peripheral components may be linked by switching fabric. The hardware 112 may further include hardware decoders and encoders, a network interface controller, and/or a universal serial bus (USB) controller. The hardware may further include light sources 140, such as LEP, APL, and/or light emitting diode (LED), configured to provide the subject plant with light in the human visible and non-visible spectrums that mimics the spectrum of natural sun light. In one embodiment, the spectrum may be enhanced as compared to natural sun light in order to obtain optimal plant growth.

In various embodiments, the luminaire 102 may include various integrated sensors. For example, a sensor may be one that is built into the luminaire 102. The sensor(s) 114 may transmit data to a master controller via the transceiver 104. The master controller is discussed in more detail later. In various embodiments, the sensors 114 of the luminaire 102 may include a light output sensor 116 to measure the intensity of the ambient light. There may be a camera 118 to capture the shape/dimensions of the subject plant. There may be ultrasonic sensors 120, 122 configured to transmit electronic pulses to, inter alia, determine a distance to the canopy of a plant and to measure the shape and the root mass of the plant. Further, there may be an electro conductivity sensor 124 for measuring soil salinity, as well as total dissolved solids (TDS) sensor 126, pH sensor 128, and soil moisture sensor 130. While the example of FIG. 1 illustrates various sensors 114, it will be understood that they are provided by way of example only and not limitation.

In one embodiment, the data is transmitted via the transceiver 104 via a wireless IEEE 802 protocol, which may be (but is not limited to) 802.15 wireless personal area network (WPAN). Integrated sensors 112 may include light output sensors 116, camera(s) 118, and ultrasonic sensors 120, 122. In one embodiment, the functionality of the light output sensor 116 and the camera 118 are combined into a single sensor. For example, the camera 118 may also function as a light output sensor 116, thereby obviating the need for an additional light output sensor 116. The combination of the light output sensor 116 and camera 118 is collectively referred to herein as a light sensor.

The memory 150 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 150 may store various software components that are executable or accessible by the processor(s) 110 of the luminaire 102. The various components of the memory 150 may include software 152 and an operating system 154. Each module may include routines, program instructions, objects, and/or data structures that perform particular tasks or implement particular abstract data types.

The software 152 may enable the luminaire 120 to perform functions and control hardware components, including the sensors 114, of the luminaire 102. In various embodiments, the software 152 may provide various functions, such as directly or indirectly instructing the radio controlled hoist to change its position, whether and how long to provide artificial lighting to the subject plant, etc.

Auxiliary Elements

Figure 2:
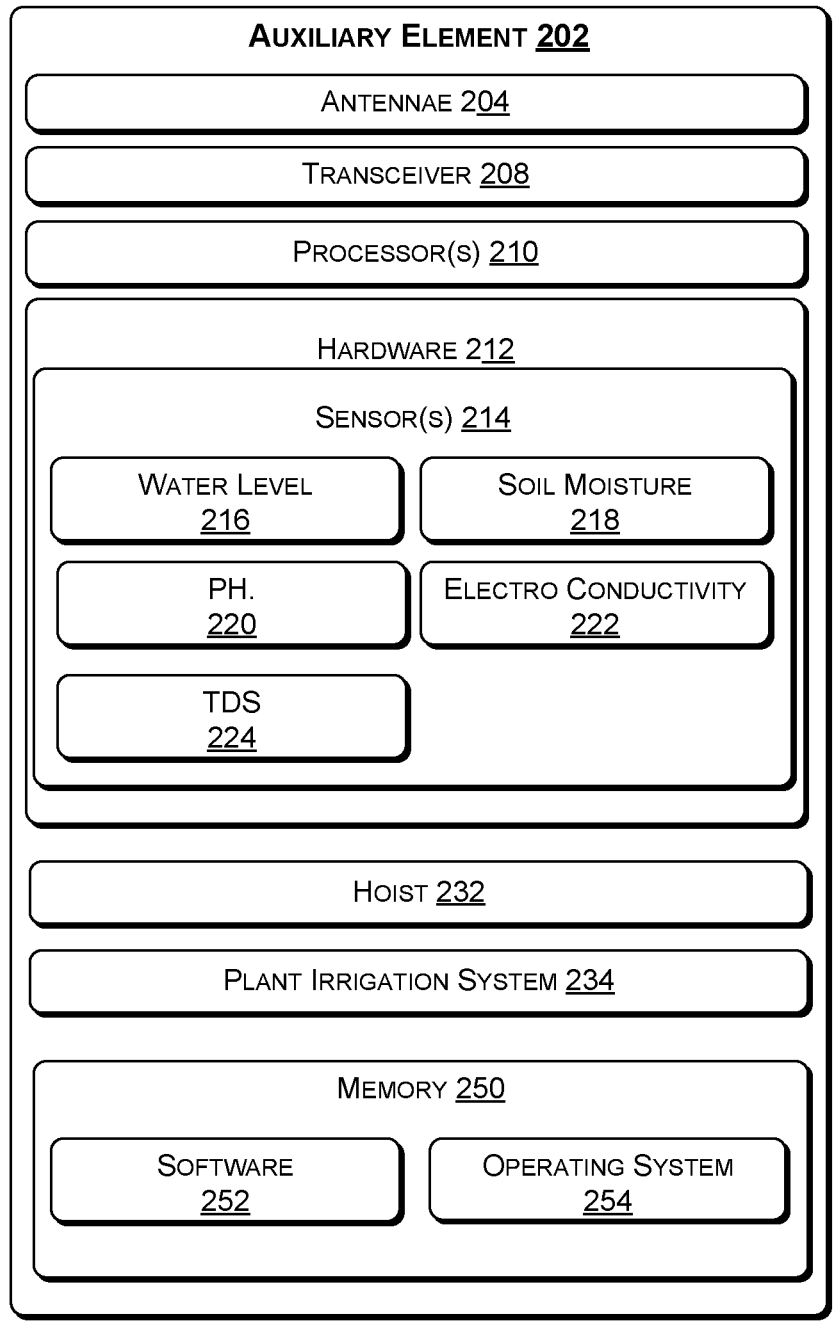
FIG. 2 is a block diagram showing various hardware, software, and communication components of an illustrative auxiliary element.

Alternatively or in addition, there may be one or more auxiliary elements. For example, an auxiliary element 202 may be a sensor coupled either directly or wirelessly to the master controller but not integrated into the luminaire 102 of FIG. 1. FIG. 2 is a block diagram showing various hardware, software, and communication components of an illustrative auxiliary element 202.

An auxiliary element 202 may include, among other components, one or more antennae 204, transceiver 204, one or more processors 210, hardware 212, and memory 230. Some of the components auxiliary element 202 are similar to those of the luminaire 102, and are therefore not discussed in detail for brevity.

The hardware 212 of the auxiliary element 202 may also include network processors that manage high speed communication interfaces, including communication interfaces that interact with peripheral components, such as a master controller (discussed in more detail in FIGS. 4, 5, and 6) and/or the luminaire 102 of FIG. 1. The network processors and the peripheral components may be linked by switching fabric. Auxiliary sensors may transmit data via the transceiver 208 via various radio technologies, such as Bluetooth, and/or Wi-Fi to a master controller, which relays information to and from a database (e.g., local or remote), allowing an authorized user to access sensor readings in real time and make adjustments, if appropriate, through a hardware interface and/or software interface 252 and/or network interface 208. Accordingly, the hardware 212 may include hardware decoders and encoders, a network interface controller, and/or a universal serial bus (USB) controller.

The hardware 212 of the auxiliary sensor may include at least one of the following sensors: a water level sensor 216, soil moisture sensor 218, pH sensor 220, a sensor for electro-conductivity 222, and a TDS sensor measuring concentration of nutrients (e.g., typically in units of parts per million).

Auxiliary elements 202 may include a luminaire hoist 232, which may be configured to receive commands from the master controller to adjust the height of the luminaire based on an ultrasonic reading and a predetermined distance to be maintained between the luminaire and the subject plant. Alternatively or in addition, auxiliary elements 202 may include a plant irrigation system 234, which may be configured to administer predetermined quantities of nutrients, soil amendments, or other water soluble products, sometimes referred to as fertigation.

Referring back to FIG. 1, radio control of the light source 140 (e.g., plasma light engine) is made possible by connecting the serial data transmit lines from the radio frequency driver of the transceiver 108 to an integrated printed circuit board (PCB) 160 inside of the lighting fixture that processes the data using a microcontroller (i.e., processor 110) and transmits the data to a central control system, in this case the master controller, through a wireless radio (e.g., transceiver 108), such as a ZigBee radio. The integrated ultrasound sensors 120, 122 and lighting sensors 116 also transmit data through the integrated PCB 160.

Auxiliary Elements

Figure 3A:
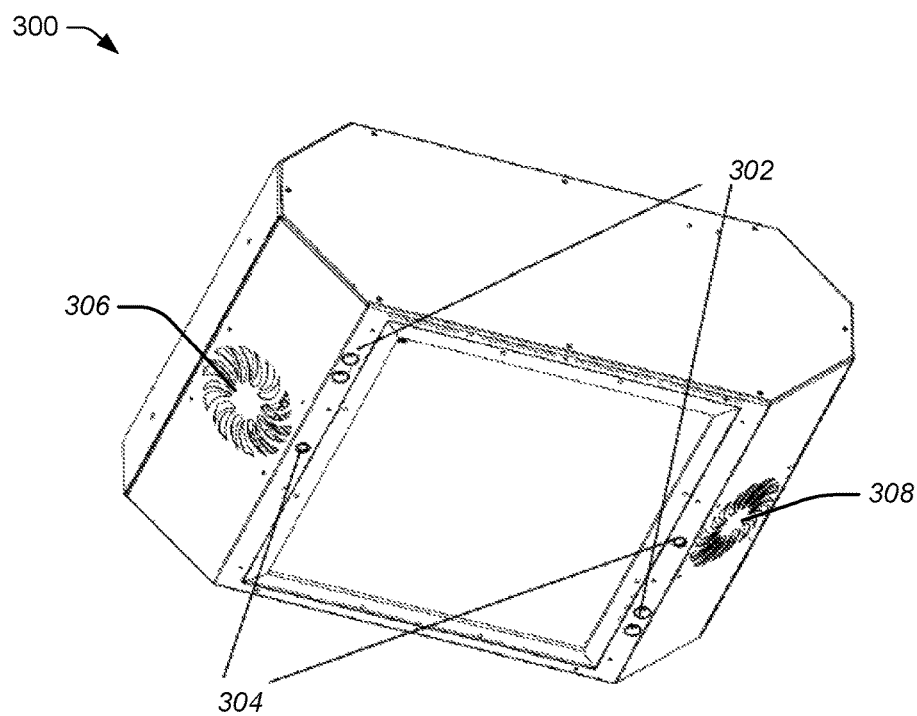
FIG. 3A illustrates a perspective view of an example horticultural luminaire.
Figure 3B:
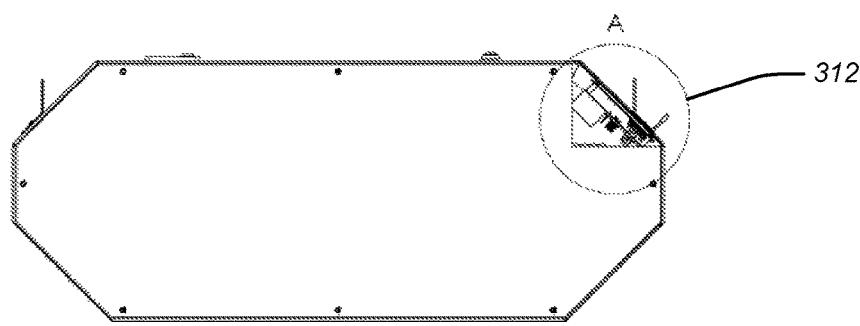
FIG. 3B illustrates a side view of an example horticultural luminaire.
Figure 3C:
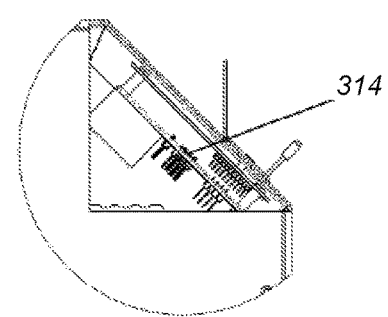
FIG. 3C illustrates a closer view of the control hardware of the luminaire of FIG. 3B.

FIGS. 3A to 3C illustrate different views of an example horticultural luminaire, consistent with an exemplary embodiment. More particularly, FIG. 3A illustrates a perspective view, FIG. 3B illustrates a side view, and FIG. 3C illustrates a closer view of the control hardware of a horticultural luminaire.

Luminaire 300 may include integrated sensors and may be able to be controlled wirelessly. In some embodiments, as shown, a luminaire 300 may be configured with one or more ultrasonic sensors 302 operative to send out and/or receive ultrasonic waves. There may be one or more light sensors 304 configured to determine the ambient light conditions in general and the light conditions of the subject plant in particular. In various embodiments, there may be one or more vents 306, 308 in order to dissipate heat that the luminaire 300 may generate.

FIG. 3B illustrates a side view of the luminaire of FIG. 3A. In one embodiment, embedded within the luminaire, there is a PCB 312 including control hardware. The control hardware 314 allows the interpretation and wireless transmittance of the data collected by the sensors as well as the ability to receive commands from a user or set software program.

In various embodiments, the luminaire 300 may be any device capable of producing visible and non-visible light, such as plasma light or any other type of solid state lighting, such as LED lighting. In one embodiment, the luminaire 300 has bulbs that can dynamically and precisely shift their light output along the entire spectrum of light. As used herein the entire spectrum of light includes the electromagnetic spectrum from infrared to near-ultraviolet, or all wavelengths that are useful to plant life, such as that provided by natural sunlight. To that end, each bulb may be set to the entire spectrum with a predetermined number (e.g., 256) of different settings along the entire lighting spectrum range.

Accordingly, a luminaire may be controlled to mimic natural sunlight and also to produce arbitrary spectrum shifts, which may provide more desirable results than those typical of perfect natural sunlight. For example, different spectrums may be applied during different periods in order to encourage growth and development and/or budding, flowering and fruiting. To that end it is noted that some plants respond with more vigorous growth when exposed to different frequencies and intensity of light. For example, blue wavelengths may enhances growth, while red wavelengths may enhance fruiting. In various embodiments, the way each particular plant responds to the different luminaire stimuli may be recorded in a database (discussed in more detail in the context of FIG. 5), which may later be used as a source for guidance for the appropriate settings of the wavelength of the luminaire over time for each particular plant.

In some embodiments, the ultrasonic sensor 302 may be any sort of device capable of creating high frequency sound waves and "listening" for the echo return pulse to determine distance from an object or create an image by interfacing with a microcontroller/processor. The ultrasonic sensor 302 may be configured to capture ultrasound data relating to the root mass of a plant, the height of the canopy of the plant, imaging, or the water level in a feeding reservoir.

In some embodiments, the light sensor 304 may be any sensor capable of detecting wavelengths within the visible light spectrum (400-700 nm) or the non-visible spectrum e.g., UV (<400 nm) and infrared (>700 nm). The light sensor 304 may be a camera. Alternatively or in addition, the light sensor 304 may be a Photosynthetically Active Radiation (PAR) sensor, which measures photons. The low heat given off by the disclosed luminaire allows for integration of a light sensor camera. Excess heat may be extracted by one or more vents 306, 308.

Managed by the master controller and database, images may be seen in real-time. Time lapse images may be automatically stored in the database at a frequency configurable by the authorized user. In various embodiments, when configured sensor criteria for triggering alerts or notifications are substantially met, a real-time image may be sent by the luminaire 300 to the control software of the master controller and/or to the authorized user. In one embodiment, these images may be put together in sequence to create a plant life time lapse. In various embodiments, these images may be stored electronically in a memory of the master controller and/or the database.

In various embodiments, the integrated PCB 312 is a device configured to integrate the luminaire 302 with the ultrasonic sensors 302 and light sensors 304, as well as enable the wireless transmission of data received by sensors and reception of commands sent by the authorized user or control program via the master controller.

Example Process

Figure 4:
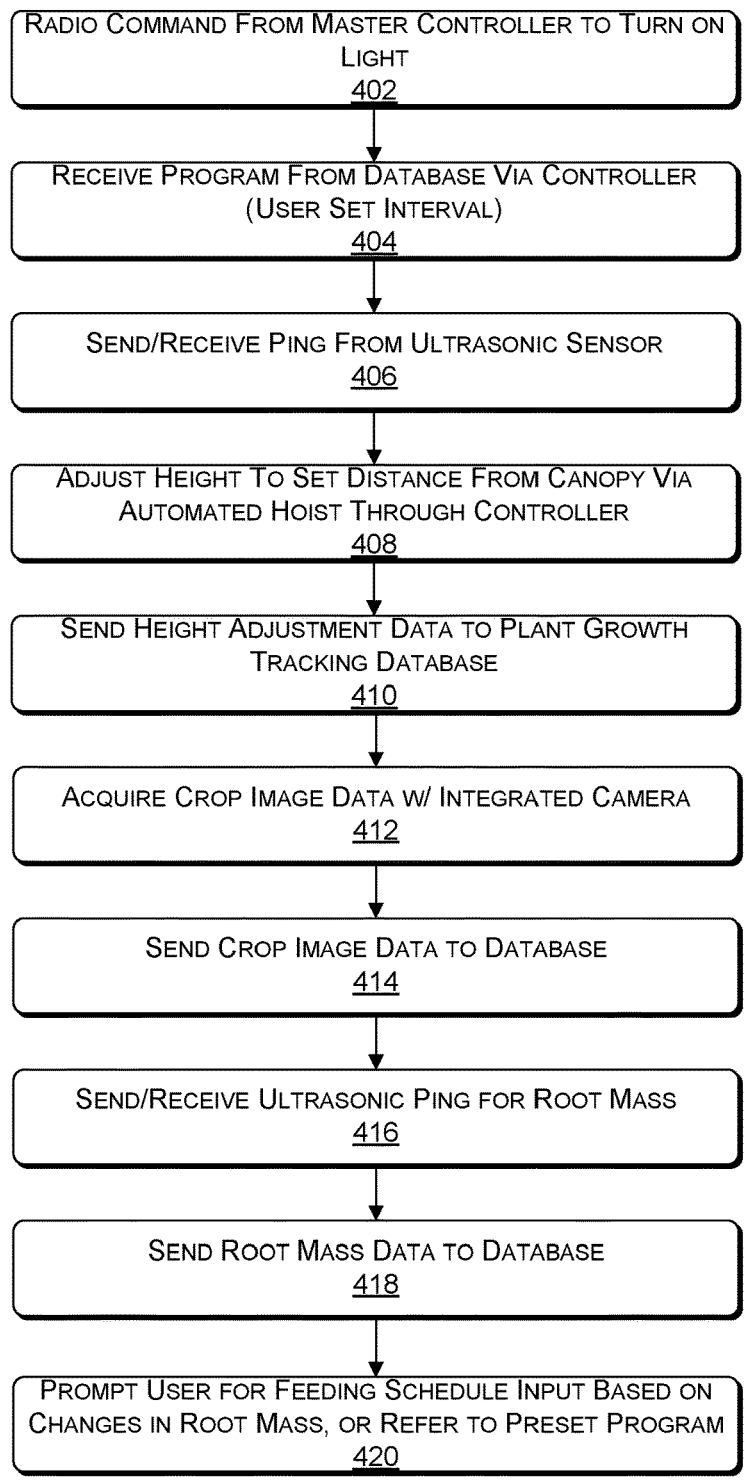
FIG. 4 illustrates high level example process for radio controlling a luminaire having integrated sensors.

With the foregoing overview of the various luminaire components, it may be helpful now to consider a high-level discussion of an example processes. To that end, FIG. 4 illustrates high level example process for radio controlling a luminaire having integrated sensors. The process 400 is illustrated as a collection of blocks in a logical flow, which each represents a sequence of operations that can be implemented in hardware, software, or a combination thereof.

In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the luminaire 102 of FIG. 1 and the auxiliary element 202 of FIG. 2.

At block 402, there is a radio (wireless) command from a master controller to turn on the light source of the luminaire 102. Once powered on, the control hardware 108 would receive instructions from the master controller at a predetermined interval that may be set by the authorized user (e.g., daily). Further, the radio frequency drivers may be configured to create the desired spectrum over time using an integrated microcontroller (e.g., combination of processor 110 and memory 150 of luminaire 102). The spectrum may be fixed over a time period or may vary during that time period. In various embodiments, the variation over time of the spectrum may be gradual (e.g., analog change) or may be discrete (e.g., different spectrum increments).

At block 404, the received instruction from the master controller triggers the ultrasonic sensors 120, 122 to determine the distance from the bottom 570 of the luminaire 102 to the plant canopy. In various embodiments, the plant canopy may be the point of the maximum height of the plant or an average of the top predetermined percent (e.g., 10%) of the plant.

At block 408, upon determining that the determined distance between the plant canopy and the luminaire 102 differs from the predetermined distance or a set range of distances in the instruction, the height of the luminaire 102 is adjusted to the desired height (e.g., distance) via a radio controlled hoist 208.

In one embodiment, the height adjustment data is then sent to the master controller, which in turn sends the height adjustment data to a database for storage, where a log is kept of the growth rate of the plants being grown (i.e., block 410). Alternatively, the luminaire 102 may (e.g., wirelessly) send a message based on the height adjustment data directly to the hoist, such that the hoist adjusts the height of the luminaire to the predetermined distance.

Next, at block 412, image data is captured data via a light sensor (e.g., integrated light output sensor 116 and/or camera 118).

At block 414, the crop image data is then sent to a database and categorized by date and time the image was captured.

At block 416, an ultrasonic sensor 120/121 may be activated. In particular, the ultrasonic sensor sends out an ultrasound signal (e.g., ping) to sense and determine the approximate root mass of the subject plant.

At block 418, the response data including the root mass of the plant is sent to the database and logged through the master controller.

At block 420, historical data related to the plant is retrieved from the database by the master controller. Based on the historical data, trends and patterns are interpreted. For example, the master controller may identify that the last sequence of wavelengths over time led to a growth spurt. In another example, the trends and patterns may indicate that the new experimental sequence of wavelengths did not improve or even degraded plant growth and/or yield. In various embodiments, based on the data interpreted (e.g., through machine learning), the master controller may create a light profile to automatically adjust the intensity and/or wavelength of the luminaire over time.

Alternatively or in addition, a notification may be sent to a user (e.g., who is responsible for the plant) with a summary of the identified trends and patterns to prompt the authorized user to adjust the feeding schedule changes based on growth rates of the root system and the plant's height.

Example System Architecture

Figure 5:
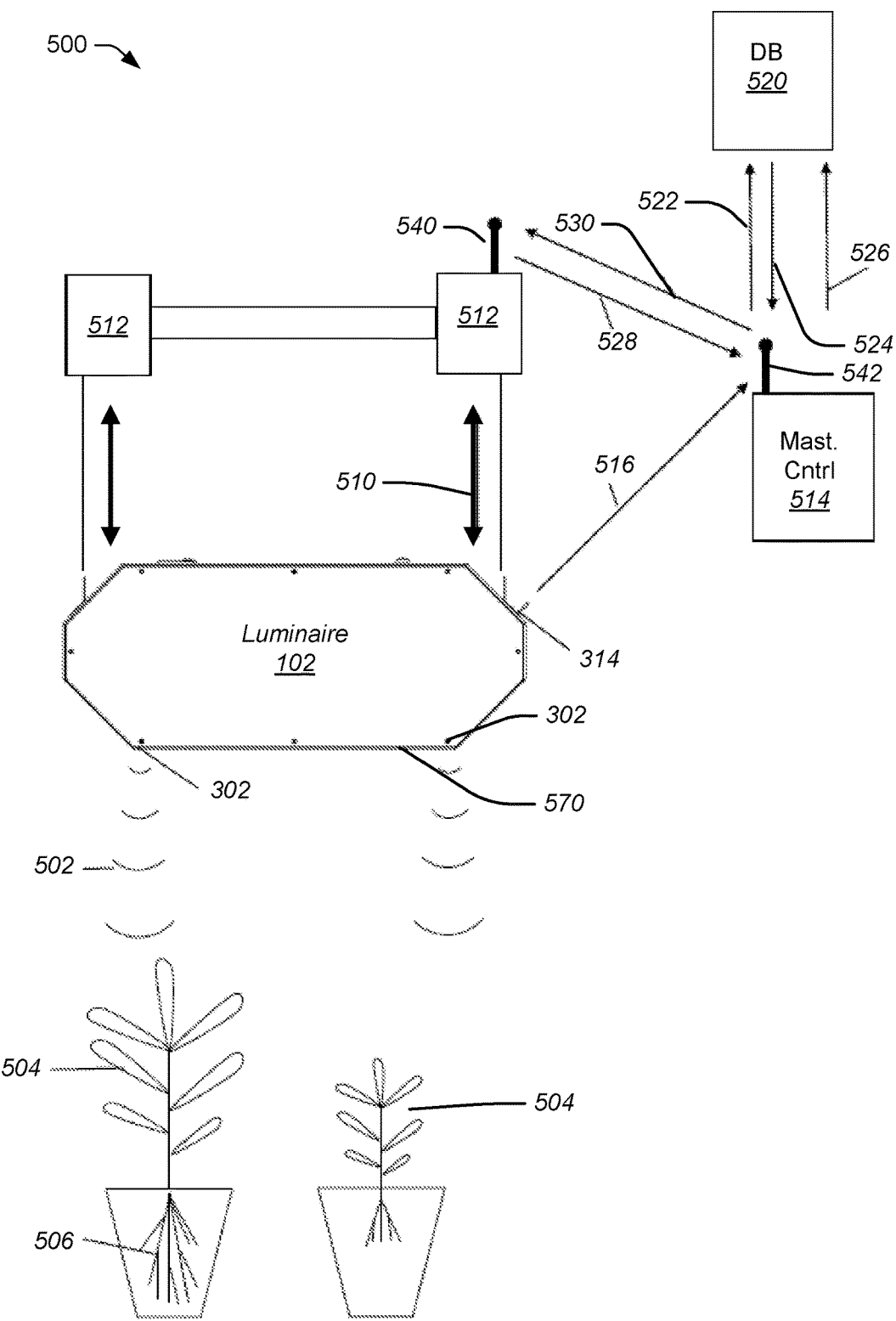
FIG. 5 illustrates an example architecture for implementing a radio controlled luminaire.

FIG. 5 illustrates an example architecture for implementing a radio controlled luminaire. For discussion purposes, system 500 includes the luminaire 102 of FIG. 1. System 500 further includes a hoist 512, a master controller 514, and a database 520. There is a subject plant 504 having a root mass 506.

Among other features, system 500 illustrates how an ultrasound sensor 302 interacts with a plant 504 and its root mass 506, as well as the transmittance of data via wireless radio. As illustrated, the master controller 514 may be configured with an intelligent radio controlled plasma luminaire 102, a hoist 512 that may be radio controlled, and a database 520 (e.g., either remote or local). Upon the master controller 514 instructing the luminaire 102 to be powered ON (i.e., by sending a power up command to the luminaire 102), the control hardware 314 of the luminaire 102 may receive input via instructions from the master controller 514 or an authorized user to trigger the ultrasonic sensor 302. The ultrasonic ping 502 from the ultrasonic sensor 302 may then determine the height of the canopy of a plant or plants 504 being grown. Put differently, a pulse of sound, referred to herein as a ping, is projected onto the plant and then the ultrasonic sensor 302 listens for reflections (e.g., an echo) of the pulse. This pulse of sound is generally created electronically using a sonar projector of the ultrasonic sensor 302, comprising a signal generator, power amplifier, and electro-acoustic transducer/array.

To measure the distance from the luminaire 102 to the plant 504, the time from transmission of the ping from the ultrasonic sensor 302 to reception is measured and converted into a range, since the speed of sound is a known parameter. The hoist is aware of the height of the luminaire 102 (e.g., the distance 510 between the luminaire 102 and the hoist 512). Accordingly, the distance from the bottom of the luminaire 102 to the plant 504 canopy is determined. In one embodiment, the root mass 506 may also be measured by the ultrasonic sensor 302.

Upon receiving the distance between the bottom 570 of the luminaire 102 and the canopy of the plant 504 and/or the root mass 506 of the plant, the control hardware 314 transmits a data packet 516 including this data to the master controller 514. The master controller 514 may then check the predetermined (e.g., programmed) distance from the canopy by sending a request data packet 522 to the database 520. The database 520 may then transmit a response data packet 524 including the distance from canopy parameters. Put differently, the database 520 may provide the predetermined distance between the canopy of the plant and the bottom 570 of the luminaire 102. In another embodiment, the master controller 514 has stored in its memory this predetermined distance.

The master controller 514 may then wirelessly 542 send a command packet 530 including the distance adjustment data (e.g., the difference between the predetermined distance and the measured distance between the luminaire and the plant canopy) to the radio controller 540 of the hoist 512. Based on this received distance adjustment data, the hoist 512 may adjust the distance between the bottom 570 of the luminaire 102 and the plant 504 by increasing or decreasing the distance 510 between the hoist and the luminaire 102.

In one embodiment, the hoist 512 sends (e.g., wirelessly 540 transmits) a confirmation to the master controller 514 via a data packet 528. In another embodiment, the command packet 530 from the master controller 514 to the hoist 512 includes the predetermined distance between the bottom 570 of the luminaire 102 and the canopy of the plant 504, instead of the distance adjustment data. The distance adjustment data is then determined by the hoist 512. Upon adjusting the distance 510 between the hoist and the luminaire 102, the distance adjustment data is then sent to the master controller 514 in a data packet 528.

The distance adjustment data (whether received from the hoist 512 or determined by the master controller 514) may be transmitted via a command data packet 526 from the master controller 514 to a database 520. This data (comprising the distance adjustment data) may then be stored in the database 520, allowing the automatic cataloging of growth data, and thus growth rates. The stored data in the database enables the authorized user to adjust various parameters, such as a feeding schedule based on an optimal growth rate for a specific crop. The optimal growth rate may be based on historic data stored in the 520 that is analyzed by the master controller 514.

In one embodiment, the master controller 514 may be any radio controlled device that is a coordinator for a mesh network. The mesh network may include integral components such as (but not limited to) a luminaire 102, a radio controlled hoist 512, and auxiliary sensors. The master controller 514 is configured to support various distributors of lighting devices while maintaining high security. In one implementation, two or more ZigBee coordinator radios may be used. For example, one of the coordinators may be programmed with the common personal area network (PAN) identifier (ID) for all devices that a lighting provider ships. The second coordinator may be programmed with the custom PAN ID and advanced encryption standard (AES) that ZigBee devices are programmed to for a secure network.

When the authorized user turns ON (e.g., applies power to) the first coordinator to act as the master controller 514, the first coordinator programmed with the common PAN ID may perform a network discovery to allow a new device to join its network. In various embodiments, the new device may be a sensor, a hoist, or another hardware element that is used in the control of plant growth. Accordingly, the authorized user may see within a user interface provided by the application software of the master controller 514 that there is a new device seeking to join the network. When the authorized user provides the command to allow the new device to join the secure network, the user control application gives permission to the master controller 514 to allow that new device to join the secure network. Alternatively, if the authorized user desires to use the second coordinator with the custom PAN ID and AES encryption as the master controller 514, the authorized user may turn ON the second coordinator and join devices to the secure network provided by the second coordinator in a similar manner as for the first coordinator. However, each new device joining the secure network of the second coordinator is to be programmed with the AES encryption key of the second coordinator in order to communicate with the second coordinator.

In one embodiment, the master controller 514 then uses Remote AT commands to set the network PAN ID and the AES encryption key to the newly joined device. Once the new device is powered OFF and back ON, it is now allowed to join the secure ZigBee mesh network. It can now be discovered on the secure network and be included to the automation control discussed herein.

For example, the master controller 514 is capable of handling upwards of thousands of connected devices, each device creating a component node within the mesh network. Each component node may be identified by a MAC address by the application software of the master controller 514, where data may be interpreted and where commands may be sent to each component's MAC address. Each new component node may be reprogrammed within the software application via the master controller to join the mesh network established by the authorized user. Subsequently, these new component nodes may be assigned to a zone/group which may correspond to a particular plant bed, room, or general area. The master controller 514 can also migrate component nodes between two secure networks for re-purposing.

The radio controlled hoist 512 may be any hoist system capable of actuating using power. Actuation may occur by use of a radio controlled power controller with a powered hoist or through use of a radio controlled 540 internal motor.

The database 520 may be any type of external or internal storage that may be located either locally or remotely. Local databases may include personal servers, dedicated hard drives etc., whereas remote databases may include server farms, cloud services, and the like. The hardware elements, operating systems and programming languages of such databases are conventional in nature. Of course, the database functions may be implemented on a cloud and/or in a distributed fashion on a number of similar platforms, to distribute the storage and/or processing load.

The plant or plants 504 may be any type of living organism that uses photosynthesis to convert light energy into chemical energy to fuel the organism's activities.

The root system 506 may be any mass within or above the growth medium that allows the intake of nutrients and water, anchors the plant to the medium, stores food and nutrients, and fosters vegetative reproduction.

The ultrasonic ping measurement data packet 516 may be any distance measurement data collected by the ultrasonic sensor 302 that is sent to the master controller 514 via the internal control hardware 314 of the luminaire 102. The data packet 516 may include the distance between the bottom 570 of the luminaire 102 and the canopy of the plant 504 and/or the root mass 506 of the plant, which the control hardware 314 transmits the master controller 514.

The request data packet 522 is any data packet that is sent by the master controller 514 to the database 520 to request information about the parameters set by the authorized user or program, which is compared to values determined by the sensors (e.g., ultrasonic sensors 302) of the luminaire 102.

The response data packet 524 is any data packet sent by the database 520 that includes parameters set by a program or authorized user that are used to check against data collected by a sensor, such as the ultrasonic sensor 302 or light sensor 304 (illustrated in FIG. 3).

The command data packet 526 is any data packet that includes a command that can be acted upon by a radio controlled device, such as (but not limited to) a radio controlled hoist system 512.

The data packet 528 is any data packet that includes data based on a physical adjustment (or a confirmation thereof) within the system 500, such as, but not limited to, height adjustment data sent by a radio controlled hoist 512 that can be logged within a database 520 via a data packet 526 sent from a master controller 514.

Real-Time Monitoring and Control of Plant Development Data

Figure 6:
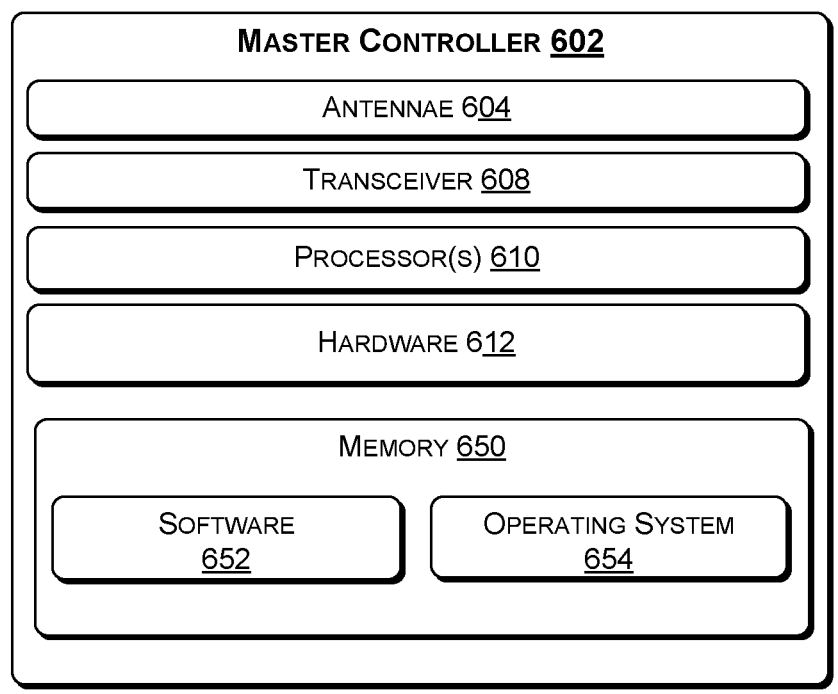
FIG. 6 provides a functional block diagram of a general purpose computer hardware platform that may be used to implement the master controller of FIG. 5.

As discussed above, functions relating to controlling a luminaire 102 can be performed by a computing device connected for wireless data communication, referred to herein as a master controller. To that end, FIG. 6 provides a functional block diagram of a general purpose computer hardware platform that may be used to implement the master controller of FIG. 5.

Master controller 602 is similar to the master controller discussed in the context of FIGS. 4 and 5. The master controller 602 may include, among other components, one or more antennae 604, transceiver 604, one or more processors 610, hardware 612, and memory 630. Many aspects of the master controller were discussed previously and some of its blocks are similar to that of the auxiliary element 202, and are therefore not repeated here for brevity.

The hardware 612 of the master controller 602 may also include network processors 610 that manage high speed communication interfaces, including communication interfaces that interact with other components in the system discussed herein, such as a remote database and/or a luminaire. The master controller 602 may transmit data via the transceiver 608 via various radio technologies, such as Bluetooth, and/or Wi-Fi to a database and/or a luminaire. The hardware 612 may include hardware decoders and encoders and a network interface controller.

The memory 650 of the master controller 602 may store various software components (e.g., programs) that are executable or accessible by the processor(s) 610. The various components of the memory 150 may include software 652 and an operating system 654. The software may include routines, program instructions, objects, and/or data structures that perform particular tasks or implement particular abstract data types. For example, the master controller 602 may have a program stored in the memory 650, wherein execution of the program by the processor(s) 610 configures the master controller 650 to perform acts (e.g., various functions), such as turning ON a luminaire, processing the distance between the luminaire and the plant canopy, sending instructions to a hoist to optimize the distance between the luminaire and the plant canopy, and other functions discussed herein.

Example Use Cases:

With the foregoing overview of the system 500, luminaire 102, and auxiliary element 202, it may be helpful to discuss some example use cases. The use cases discussed herein depict implementations in accord with the present teachings, by way of example only, not by way of limitation. It will be understood that various other use cases are supported as well based on the teachings herein.

Real-Time Monitoring and Control of Plant Development Data

The lighting system discussed herein may use sensors that are communicatively coupled via radio to automatically measure and record to a database a comprehensive set of data relating to the provenance of plants on a per-plant basis, and in some instances, a per-plant group basis. In various embodiments, sensors may include ultrasound sensors, an integrated camera, a light sensor as well as sensors for electro-conductivity, total dissolved solids (TDS), pH, and soil moisture. Accordingly, sensor measurements may include ultrasound images of root mass, height of canopy, water depth, pH, EC, PPM, and volumetric water content.

Upon the sensors of the luminaire collecting measurements, those measurements may be optionally stored in a database. In various embodiments, these measurements may be analyzed by control software at the database itself or a master controller. Put differently, machine learning may be used to identify patterns and trends in the plant growth. If the control software detects the existence of predetermined conditions, the control software may direct the luminaire and/or the hoist, and/or other controllable elements of the lighting fixture to change settings. In this way, the sensors work in concert with the luminaire to provide a feedback loop.

In one embodiment, the control software runs nearly continuously and therefore may monitor and adjust the luminaire in substantially real-time upon determining triggering events. For example, a triggering event may be the commencement of a new time period or a determination by the master controller that the plant has deteriorated and would benefit from immediate action.

As mentioned above, in one aspect, the control software performs machine learning in that it is configured to determine whether the adjustments by the luminaire have had a positive effect on the plant or plants. In one embodiment, the control software may perform different permutations of wavelengths and intensity of light over time. For example, upon determining that such adjustments are improving the growth and/or yield of the plants, the control software may determine if subsequent adjustments cause additional improvement. In one embodiment, upon determining that subsequent adjustments are not providing additional improvement, the improvement may be considered to have converged to a set of lighting fixture settings that is optimal. The control software may store those settings in the master controller 514 or the database 520 so that an authorized user may reuse those settings for this and/or other plants, thereby enabling electronic transmission of optimal parameters to other locations.

In one example, an integrated ultrasound sensor 302 is configured to collect data relating to the mass of a plant root 506, the height of a canopy 504, and the level of water in a tank. The ultrasonic sensor 320 is configured to detect an image of the plant roots 506 for plants in soil and for hydroponics, since roots have a different resonance frequency than dirt and water.

Upon storing multiple pictures into the database 514, the images may be compared over time to monitor growth. Additionally, the ultrasound 302 may be used to measure the distance from the sensor to the canopy and or the bottom of the root mass, thereby providing a measurement of growth. The measurement of distance from one time period to another determines whether the adjustments in the system are having a positive effect on the plant or plants. Upon the control software determining that the adjustment(s) are improving the plants (e.g., in growth height, yield, etc.), the control software may determine if subsequent adjustments cause additional improvement.

Upon determining that subsequent adjustments are not providing additional improvement, the improvements are considered to have converged to a set of settings that are optimal. The control software may store those settings so that an authorized user may reuse those settings for other plants as well, thereby enabling electronic transmission of optimal parameters to other locations.

In one embodiment, the ultrasound sensor has a built in (or is coupled to) a transducer that emits ultrasound waves down into the water. As the waves travel through the different densities of matter, they reflect back up, which aids in measuring how full a reservoir/watering tank is by pinging under water and the distance from the bottom of the tank to the water level. This sensor data may be also used to determine whether the tank should be refilled. For ultrasonic sensors used in soil-based systems, an ultrasonic reflection is able to provide a depiction of the roots since roots have a different resonance frequency than dirt.

Accordingly, by virtue of the control software and sensors of the system 500 discussed herein, control and monitoring of the luminaire's 102 spectrum settings, luminaire height, the plant's feeding schedule and composition, root-to-soil measurements, canopy height, waste composition, and images of plants are provided.

Example Database of Plant Provenance

A database 520 communicatively coupled to the control software may be continually updated to keep a record of plant development and a history of the related sensors and controlled components. Each electronic component of the system 500, such as the hoist 512 or the luminaire, may be controlled via radio. In one embodiment, the database 520 is controlled via radio. The data that has been sent to the database 520 can be updated whenever sensor data is captured, at predetermined intervals, and/or when a status of a plant being monitored has changed.

The light sensor may be configured to periodically upload captured images to the database at a frequency set by the authorized user. In one embodiment, authorized users may access the database to see time lapse images of a plant's development or to analyze historical data to isolate leading indicators of desirable plant growth.

In one example, the control software may review sensor data to identify plants that are failing or are in less than an optimal state. The control software may then select recent images of the plants and send them to a user to determine a course of action based on reviewing the images. Specific images with noticeable plant changes over a specific time period can then be traced to certain changes or amendments to the environment that caused such changes.

Initiating Software Events in Response to Sensors

As discussed above, the system 500 may include various sensors. Sensors that are coupled to the master controller 514 via radio may allow automated notifications and adjustment of radio-controlled components. The criteria for executing software events based on sensor data may be specified in the software application (e.g., of the master controller 514).

For example, criteria may trigger software events to command actions, which may include adjusting a luminaire height in response to canopy height, refilling a water tank in response to sensing a low amount of water in the tank via ultrasound, altering the watering or nutrient-feeding schedule, altering the nutrient feeding composition, altering the spectrum output setting of the luminaire, altering the ambient temperature, altering the $CO_2$ output, altering the heat provided to the root system, sending notifications to the authorized user including images and relevant data. Predefined criteria for the software events may be substantially satisfied by sensor data compared to the information obtained from the database. In one embodiment, the database is updated after a change is made.

An automatic response may be configured to be a notification to one or more authorized users, such as an administrator of the plant or owner. The authorized user may be prompted to change an activity. In one embodiment, there may be a summary of sensor data or photographic image(s) of the plant of the detected anomaly or both sent to the authorized user, which may be displayed on a user device, such as a mobile device, tablet, portable computer, desktop, or the like.

Rapid Improvement of Plant Development

The disclosed horticultural lighting system, with its abilities to monitor plant development data in real-time and to process historical plant life cycle data, provides an approach to rapidly improve plant development. Because sensor data can be viewed in real time, and compared immediately with recent data from the same crop (or other similar crops) stored in a database, changes to any sensed data (e.g., plant growth, canopy height, root mass, pH, electro-conductivity, total dissolved solids composition, soil moisture content, etc.) can be measured with a controlled change to a variable affecting plant development (e.g., feeding composition, feeding frequency/volume, watering frequency/volume, lighting spectrum settings, luminaire height).

Because the disclosed system provides comprehensive monitoring and automated sensing, designed experiments may be performed from the master control software to gradually improve upon existing methods at a much more rapid pace than had been previously allowed by prior horticulture systems. For example, instead of several days or even weeks it has taken to monitor changes to plant development due to input parameters, the system discussed herein can detect various effects of changes in plant status and growth development within minutes, hours, or days, because of the fidelity and integration of the sensors.

Advantageously, the system does not need more human intervention with the addition of additional crops. That is because, the method and system discussed herein is scalable. For example, the control can be implemented via the cloud for geographically disparate crops, and the integrated/auxiliary sensors may be non-invasive and inexpensive as compared to many higher-fidelity sensors commonly used. Further, the system may be configured to provide data in real-time.

For example, the TDS sensors may be used to improve upon the efficiency of nutrient feeding (fertigation) composition and frequency by measuring the fertigation solution before the plant has absorbed the nutrients and after. By detecting what is not being used, and what does not contribute to improvements in growth, plant development methodology may be incrementally improved at a rate much faster than conventional systems.

The comprehensiveness and fidelity of the plant development database may allow an authorized user to measure when growth cycle reaches defined phases. Variables may be strategically introduced and administered experimentally to determine leading indicators and contribute to predictive analytics, sometimes referred to herein as machine learning.

Accordingly, the disclosed system provides an efficient, elegant, scalable solution to existing problems with horticultural lighting. The various aspects of the present system include a low cost of sensors; low installation requirements; being built with the whole system in mind; microcontrollers having the ability to handle thousands of nodes; and having the ability to monitor and control development of geographically disparate crops via the cloud.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

It is understood that any specific order or hierarchy of steps in the process disclosed (e.g., FIG. 5) is an illustration of an exemplary approach. Based upon design preferences, it is understood that the specific order or hierarchy of steps in the processes may be rearranged, expanded, and some steps omitted. Some of the blocks may be performed simultaneously.

Unless otherwise stated, any measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A horticultural luminaire for providing light to at least one plant through a plurality of growth stages of the at least one plant, the luminaire comprising:
    a processor;
    a wireless transceiver coupled to the processor;
    an ultrasonic sensor coupled to the processor;
    a memory communicatively coupled to the processor, the memory storing one or more computer-executable instructions which when executed by the processor direct the luminaire to:
    trigger the ultrasonic sensor to measure a distance from a bottom of the luminaire and a canopy of the at least one plant; and
    communicate, via the wireless transceiver, with at least one of a master controller or with a hoist coupled to the luminaire, to actuate the hoist to adjust a height of luminaire based on the measured distance, wherein the height of the luminaire is adjusted to maintain a predetermined distance between the bottom of the luminaire and the canopy of the at least one plant through the plurality of growth stages.

2. The luminaire of claim 1, wherein execution of the computer-executable instructions further directs the luminaire to:
    trigger the ultrasonic sensor to capture ultrasound data indicating a root mass of the at least one plant;
    wirelessly transmit the ultrasound data, via the wireless transceiver, to the master controller; and
    wirelessly receive, via the wireless transceiver, one or more commands generated by the master controller based on the ultrasound data to change one or more settings of the luminaire.

3. The luminaire of claim 1, wherein execution of the computer-executable instructions further directs the luminaire to:
    trigger the ultrasonic sensor to capture ultrasound data indicating a water level in a feeding reservoir for the at least one plant;
    wirelessly transmit the ultrasound data, via the wireless transceiver, to the master controller; and
    wirelessly receive, via the wireless transceiver, one or more commands generated by the master controller based on the ultrasound data to change one or more settings of the luminaire.

4. The luminaire of claim 1, further comprising at least one of: a total dissolved solids (TDS) sensor, a pH sensor, and a soil moisture sensor.

5. The luminaire of claim 1, wherein execution of the computer-executable instructions further directs the luminaire to:
receive a first command, via the wireless transceiver, from the master controller; and
trigger the ultrasonic sensor to measure the distance in response to the first command.

6. The luminaire of claim 1, wherein execution of the computer-executable instructions further directs the luminaire to:
determine height adjustment data based on a difference between the measured distance and the predetermined distance; and
wirelessly transmit a message, via the wireless transceiver, to the hoist, wherein the message is based on the height adjustment data to actuate the hoist to adjust the height of the luminaire to the predetermined distance.

7. The luminaire of claim 1, wherein execution of the computer-executable instructions further directs the luminaire to:
wirelessly transmit the measured distance, via the wireless transceiver, to the master controller, wherein the master controller is configured to wirelessly communicate with the hoist to actuate the hoist to adjust the height of the luminaire to the predetermined distance based on the measured distance.

8. The luminaire of claim 1, wherein actuation of the hoist to adjust the height of the luminaire includes increasing or decreasing a distance between the hoist and the luminaire.

9. The luminaire of claim 1, further comprising:
a light source to generate the light to provide to the at least one plant, wherein a spectrum of the light generated by the light source is controlled by the luminaire according to a spectrum output setting, wherein execution of the computer-executable instructions further directs the luminaire to:
receive a second command, via the wireless transceiver, from the master controller; and
adjust the spectrum output setting in response to the second command to change the spectrum of the light generated by the light source.

10. The luminaire of claim 9, wherein execution of the computer-executable instructions further directs the luminaire to:
adjust the spectrum output setting in response to the second command to fix the spectrum of the light generated by the light source over a time period.

11. The luminaire of claim 9, wherein execution of the computer-executable instructions further directs the luminaire to:
adjust the spectrum output setting in response to the second command to vary the spectrum of the light generated by the light source over a time period.

12. The luminaire of claim 11, wherein varying the spectrum of the light generated by the light source over the time period comprises gradually changing the spectrum of the light over the time period.

13. The luminaire of claim 11, wherein varying the spectrum of the light generated by the light source over the time period comprises changing the spectrum of the light in discrete increments over the time period.

14. The luminaire of claim 9, wherein the second command to adjust the spectrum output setting is generated by the master controller based on at least one of: sensor data collected by the luminaire or sensor data collected by one or more other luminaires.

15. A master controller configured to control a luminaire to provide light to at least one plant through a plurality of growth stages of the at least one plant, the master controller comprising:
a processor;
a wireless transceiver coupled to the processor;
a memory communicatively coupled to the processor, the memory storing one or more computer-executable instructions which when executed by the processor direct the master controller to:
wirelessly receive data, via the wireless transceiver, from the luminaire, wherein the data corresponds to a measured distance determined by an ultrasonic sensor of the luminaire, wherein the measured distance is a distance from a bottom of the luminaire to a canopy of the at least one plant; and
communicate, via the wireless transceiver, with a hoist coupled to the luminaire to actuate the hoist to adjust a height of luminaire based on the measured distance, wherein the height of the luminaire is adjusted to maintain a predetermined distance between the bottom of the luminaire and the canopy of the at least one plant through the plurality of growth stages.

16. The master controller of claim 15, wherein a spectrum of the light provided by the luminaire is generated according to a spectrum output setting, wherein execution of the computer-executable instructions further directs the master controller to:
retrieve data from a database corresponding to how the at least one plant responds to different luminaire stimuli;
determine an adjustment to the spectrum output setting based on the data; and
wirelessly transmit a command, via the wireless transceiver, to the luminaire, wherein the command indicates the adjustment to the spectrum output setting to change the spectrum of the light generated by the luminaire.

17. The master controller of claim 16, wherein the command directs the luminaire to vary the spectrum of light provided by the luminaire over a time period, wherein varying the spectrum of light over the time period comprises at least one of: gradually changing the spectrum of light over the time period or changing the spectrum of light in discrete increments over the time period.

18. The master controller of claim 16, wherein execution of the computer-executable instructions further directs the master controller to:
wirelessly receive, via the wireless transceiver, sensor data, wherein the sensor data is collected by at least one of: the luminaire or one or more other luminaires; and
update the database with the sensor data to record development of the at least one plant over time, wherein the command to adjust the spectrum output setting is generated by the master controller based on the updated database.

19. The master controller of claim 18, wherein the sensor data comprises at least one of: ultrasound data indicating a water level in a feeding reservoir for the at least one plant, ultrasound data indicating a root mass of the at least one plant, one or more images of the at least one plant, total dissolved solids (TDS) sensor data, pH sensor data, and soil moisture sensor data.

20. The master controller of claim 16, wherein execution of the computer-executable instructions further directs the master controller to:
retrieve historical data for the at least one plant from the database; and identify a trend for the at least one plant based on the historical data, wherein identifying the trend includes correlating a sequence of wavelengths included in a previous spectrum of the light provided by the luminaire to a growth rate or yield of the at least one plant, wherein determining the adjustment to the spectrum output setting is based on the trend.

* * * * *

UNITED STATES PATENT AND TRADEMARK OFFICE
CERTIFICATE OF CORRECTION

| | |
|---|---|
| PATENT NO. | : 10,021,837 B2 |
| APPLICATION NO. | : 15/011436 |
| DATED | : July 17, 2018 |
| INVENTOR(S) | : Adam Phillip Takla Greenberg et al. |

Page 1 of 1

It is certified that error appears in the above-identified patent and that said Letters Patent is hereby corrected as shown below:

On the Title Page

Applicant name is incorrect, iUNU, LLC, the correct Applicant name is iUNU, Inc.

Signed and Sealed this
Sixteenth Day of July, 2019

Andrei Iancu
*Director of the United States Patent and Trademark Office*